Jan. 26, 1971  J. A. FOURNIER  3,559,018
TWO-LOOP CONTROL SYSTEM
Filed Sept. 6, 1968  5 Sheets-Sheet 1
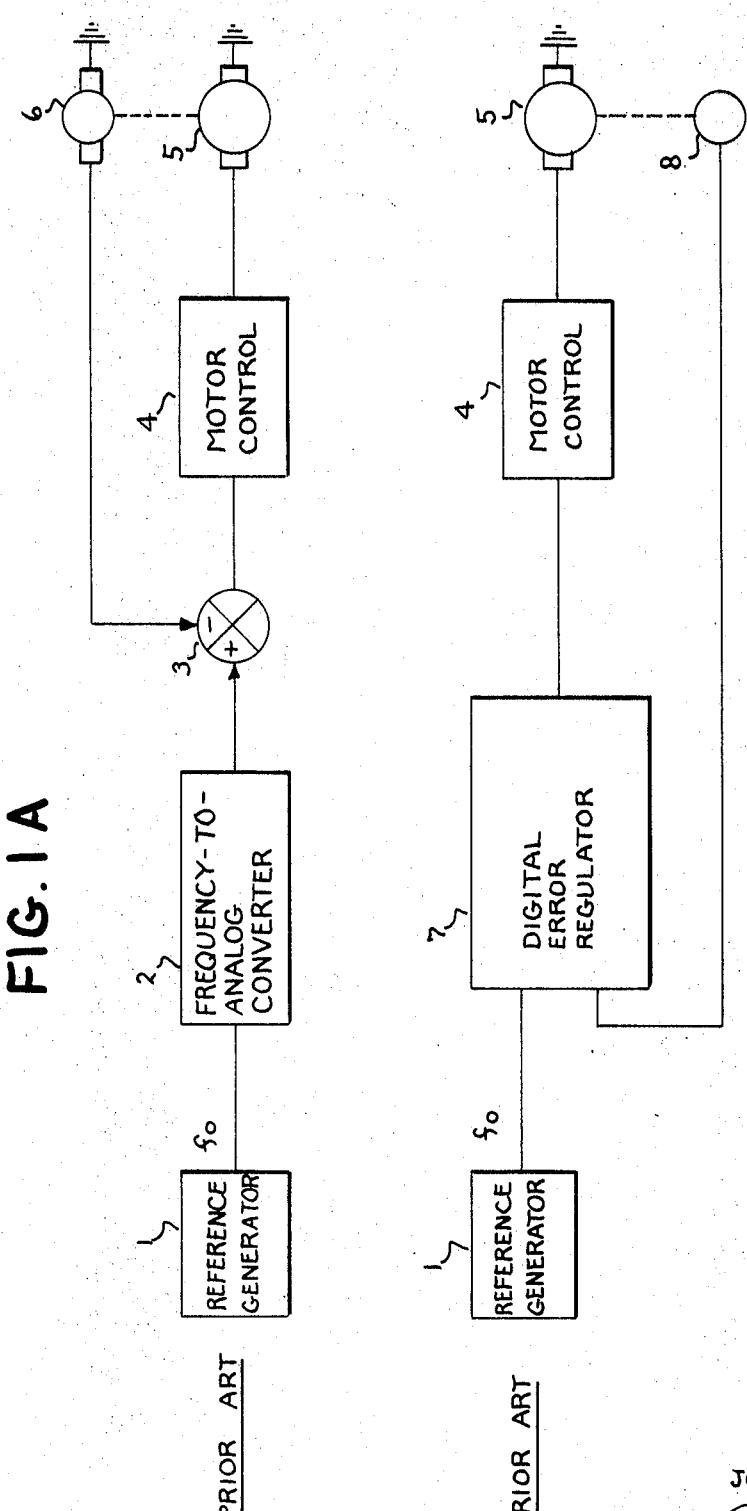
FIG. IA  PRIOR ART
FIG. IB  PRIOR ART
INVENTOR.
JOSEPH A. FOURNIER
BY
HIS ATTORNEY

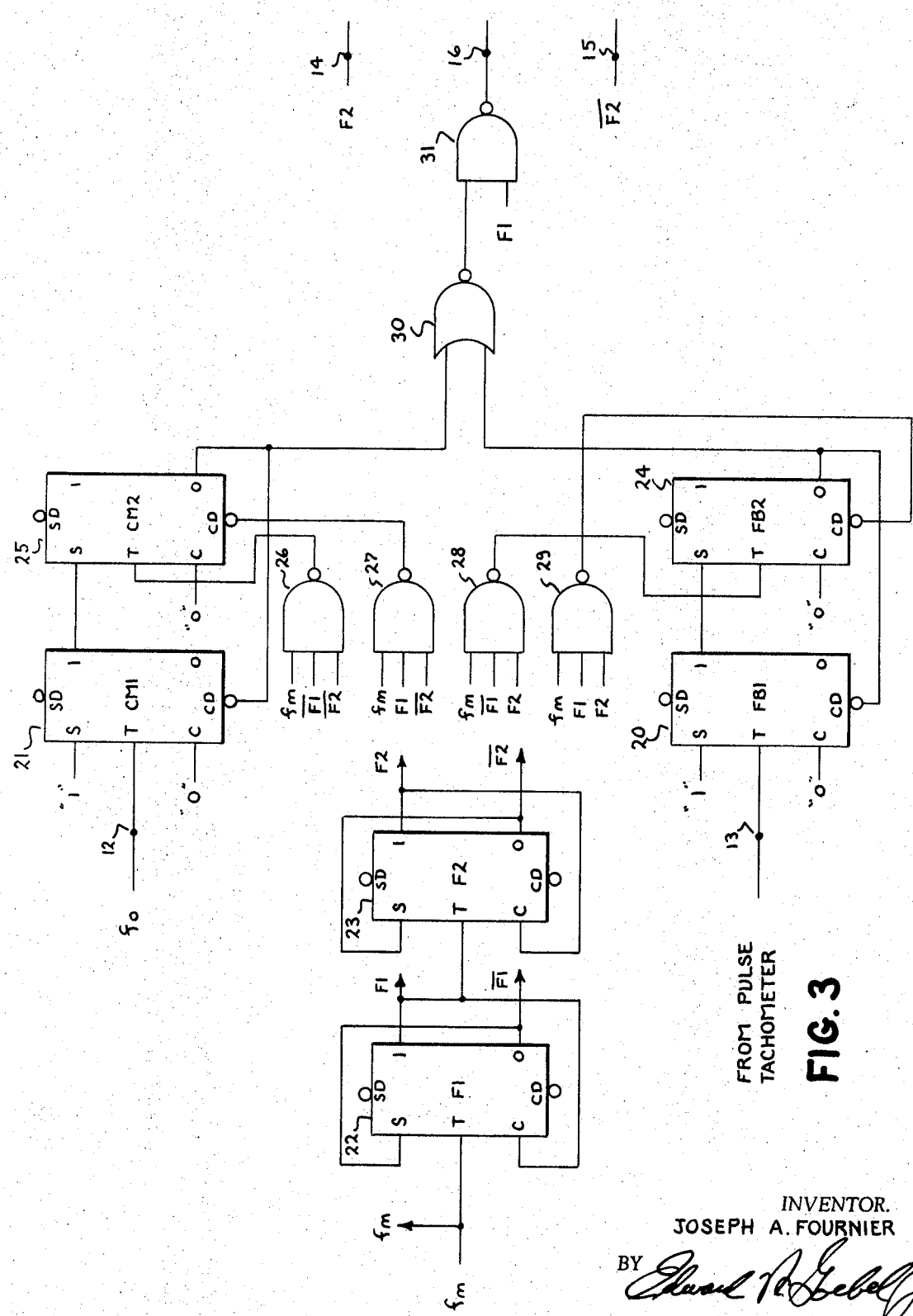

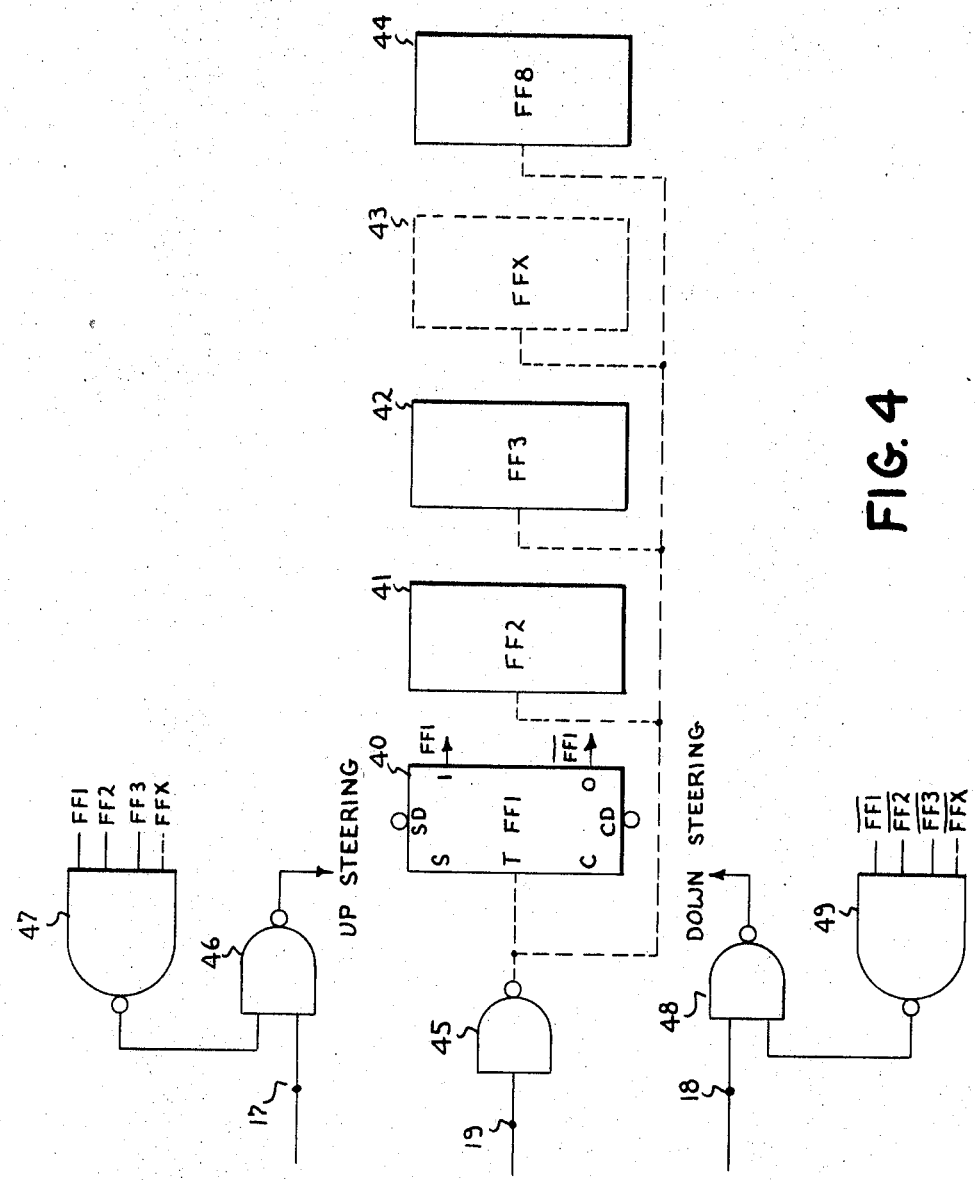

United States Patent Office 3,559,018
Patented Jan. 26, 1971

3,559,018
TWO-LOOP CONTROL SYSTEM
Joseph A. Fournier, Erie, Pa., assignor to General Electric Company, a corporation of New York
Filed Sept. 6, 1968, Ser. No. 757,847
Int. Cl. H02p 5/06
U.S. Cl. 318—314                 8 Claims

ABSTRACT OF THE DISCLOSURE

A motor is accurately controlled without system instability by providing a motor control system having two control loops, a main analog loop which is operative throughout the entire range of operation of the motor, and a second vernier loop, of the digital type, which operates over a limited range of the system to compensate for inaccuracies and drift in the main analog loop.

BACKGROUND OF THE INVENTION

The present invention relates to servomechanisms, and more specifically, to servomechanisms for accurately controlling the operation of electric motors.

While this invention is capable of being advantageously applied to the control of many different types of loads, it is particularly desirable for controlling electric motors, such as direct current motors, and it will be described hereinafter for this purpose.

In their simplest form, known systems for motor control have consisted of a closed control loop, utilizing an analog voltage for a reference, this voltoge representing a desired state of a controlled characteristic of the motor such as its speed. This analog voltage is compared with the output of apparatus which senses the actual state of the controlled characteristic, such as a conventional tachometer attached to the motor being controlled. The result of this comparison is an error signal which controls the transfer of power to the motor. Such systems have the advantage of being relatively simple and easy to stabilize for a wide variety of motor-load combinations. Such systems are, however, relatively inaccurate and tend to be susceptible to drift as a result of temperature variation, line voltage change, components aging, etc.

More advanced systems of motor control adopt digital techniques for the precise control of motor speed. Such systems employ some type of digital error regulator which operates from a digital input signal and a digital feedback from the motor being controlled. Such digital systems are highly accurate and tend to be relatively insensitive to the sources of drift which affect analog systems. However, the sensitivity of such digital systems tends to affect their stability and, in some applications, a purely digital system may, for stability reasons, be forced to operate at low gain thereby sacrificing a significant portion of its inherent accuracy.

SUMMARY OF THE INVENTION

Accordingly, it is an object of the present invention to make use of the desirable characteristics of both analog and digital control systems, without the inherent disadvantages of either.

It is a further object of the present invention to accurately control motor speed and, at the same time, avoid problems of system instability.

The foregoing and other objects are accomplished by controlling motor speed with two control loops. The first loop provides control over the entire range while the second acts to compensate for the errors in the first, over a limited portion of the range.

DESCRIPTION OF THE DRAWINGS

FIG. 1(a) is a block diagram of prior art analog motor control systems;
FIG. 1(b) is a block diagram of prior art digital motor control systems;
FIG. 3 is a logic diagram of the anti-coincidence detector shown in FIG. 2;
and
FIG. 4 is a logic diagram of the reversible counter shown in FIG. 2.

DESCRIPTION OF THE PREFERRED EMBODIMENTS

Figure 1C:
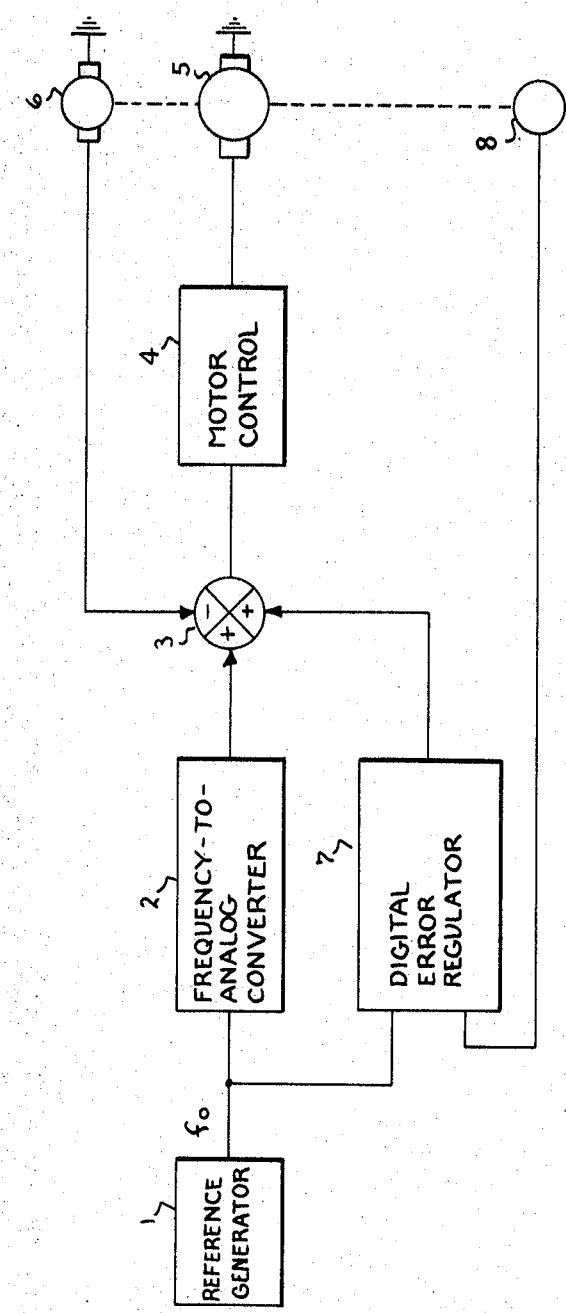
FIG. 1(c) is a block diagram of the combined motor control system constituting a preferred embodiment of the present invention.

Turning now to FIG. 1(a) there is shown a motor speed control system of the analog type well known in the prior art. The control system utilizes a reference generator 1 for generating a time-varying-signal whose frequency, $fo$, is indicative of the motor speed desired. The reference generator 1 may, in its simplest form, comprise a variable frequency oscillator. In more complex systems, the reference generator 1 may include various digital elements for controlling the generation of frequency, $fo$ so as to control acceleration, deceleration, etc. The output of the reference generator 1 is fed to a frequency-to-analog converter 2 which serves to convert the frequency, $fo$, to an analog voltage proportional to the frequency of the input signal. This analog voltage is fed from the frequency-to-analog converter 2 to form one input to a summing point 3. The output of the summing point 3 is fed to some type of motor control 4 which operates to control the transfer of power to the motor 5. If the motor 5 is a DC motor, as shown, the motor control 4 may comprise, for example, an SCR drive package which operates to control the firing of the SCR's in order to achieve the desired transfer of DC power to the motor 5. On the other hand, if the motor 5 is an AC motor, the motor control 4 may be some type of variable frequency or voltage generator such as a solid-state inverter.

In order to control motor speed, there is provided motor speed indication means such as tachometer 6, coupled to the motor 5. The output of tachometer 6 forms the second input to the summing point 3. The voltage generated by the tachometer 6 is indicative of the speed of the motor and hence the output of the summing point 3 is an analog error signal indicative of the difference between desired motor speed and the actual motor speed. As was pointed out above, such systems are relatively simple, inexpensive, and tend to stabilize easily over a wide range of motor-load combinations. However, the system of FIG. 1(a) is susceptible to inaccuracies resulting from drift which may be caused by temperature variation, line voltage variation, component aging, etc.

Referring now to FIG. 1(b) there is shown a digital motor speed control system of the type also well known in the art. A reference generator 1 is similarly furnished supplying an output frequency, $fo$, indicative of the desired motor speed. The output of the reference generator 1 forms a first input to a digital error regulator 7. The output of digital error regulator 7 is fed to a motor control 4 which operates to control the transfer of power to the motor 5. Connected to the motor 5 is a digital feedback means such as, for example, pulse tachometer 8. The output of the pulse tachometer 8 is fed to a second input of the digital error regulator 7. Accordingly, the digital error regulator 7 operates to compare the input from the reference generator 1 with the input from the feedback pulse tachometer 8 and generate an error signal indicative of the difference between these signals. Since a system of this type is essentially a position control system, it can operate to control motor speed without the inherent lag in motor speed which is a necessary element of the analog control system shown in FIG. 1(a).

Turning now to FIG. 1(c) there is shown in block diagram form a preferred embodiment of a motor control system utilizing the present invention. The essence of system of FIG. 1(c) is that it embodies the elements of the prior art systems shown in FIGS. 1(a) and 1(b). That is, the analog control scheme of FIG. 1(a) is provided by taking the output of the reference generator 1, feeding it into a frequency-to-analog converter 2 whose analog voltage output forms one input to a summing point 3. Feedback from motor speed indication means such as tachometer 6 forms a second input to the summing point 3 and the output of the summing point 3 feeds the motor control 4 for controlling the transfer of power to the motor 5. Hence, the system of FIG. 1(c) includes a main analog control loop which operates with all the advantages of an analog control loop to control motor speed. As was noted above, the disadvantages of a purely analog control loop are inaccuracy and drift. The system of FIG. 1(c) overcomes these disadvantages by providing a digital error regulator 7 whose first input includes the output of the reference generator 1 and whose second input is connected to the output of a pulse type tachometer 8. The resulting error signal at the output of the digital error regulator 7 is then fed to the summing point 3 to compensate for the inherent inaccuracies of the main control loop. Hence, the digital error regulator 7 forms essentially a vernier control loop which operates to remove the inaccuracies resulting in the main control loop.

While the present embodiment utilizes an analog loop for the main loop and a digital loop for the vernier loop, it should be noted that the main control loop could be a digital loop and the vernier loop could be a highly accurate analog loop. The configuration shown is, however, preferred since the essential characteristics of the two loops are best, and most inexpensively, satisfied in that fashion.

While the system of FIG. 1(c) utilizes a conventional tachometer 6 and a pulse tachometer 8 as the motor speed indication means, it is obvious that only one of these devices need be provided, as the armature voltage of a direct-current motor could be used in place of the tachometer 6. For example, if only the conventional tachometer 6 were provided, its output could be fed to an analog-to-frequency converter whose output could then form the input to the digital error regulator 7 which is now provided from the pulse tachometer 8. On the other hand, if only the pulse tachometer 8 were provided, its output could be fed through a frequency-to-analog converter in order to generate an analog voltage which would then be fed into the summing point 3 in place of the output of the conventional tachometer 6. Those skilled in the art of providing controls for various load devices will recognize that similar signals which represent the state of other controlled characteristics of motors or of controlled characteristics of load devices other than motors can be similarly used.

During system operation, it can be seen that motor control is provided primarily by means of the main analog control loop with the evrnier digital loop providing the necessary correction. So long as the output of the reference generator 1 is a relative constant frequency, the motor speed desired will be relatively constant, and the digital error regulator 7 will provide very precise control of the speed of motor 5 by generating a corrective signal to compensate for the errors in the main control loop. Hence, while the main control loop will have the capability to control speed over the full range of the system, the digital error regulator 7 may be limited to the control speed over a very limited range, say ten percent of the total speed range. In this way, the digital error regulator 7 can act to very precisely control the speed of the motor 5.

However, if the input frequency should suddenly vary or if the load is subject to significant variations, there may be condition whereby the error (on a transient basis) exceeds the limited range of the digital error regulator 7. Under these conditions, the digital loop is essentially disabled and only the main loop is utilized to control motor speed. As soon as the transient condition passes, the digital loop will once again come into operation to provide precise speed control. Hence, the overall system is extremely accurate during relatively steady-state conditions of input and load and, at the same time, extremely stable during transient conditions, since the high gain digital loop is essentially inoperative during transient conditions.

Figure 2:
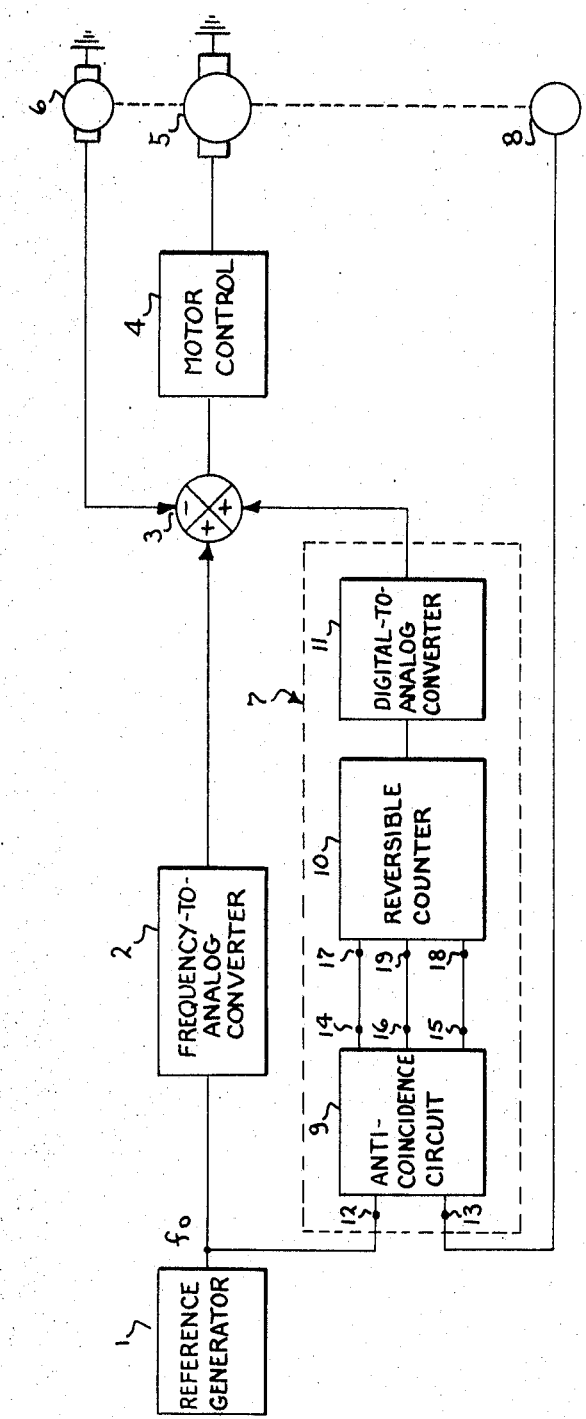
FIG. 2 is a more detailed block diagram of the preferred embodiment particularly illustrating the components of the digital error regulator of FIG. 1(c)

Turning now to FIG. 2, there is shown a more detailed block diagram of the preferred embodiment of the present invention as shown in FIG. 1(c). The elements of FIG. 2 correspond to those shown in FIG. 1(c). FIG. 2 illustrates the components of the digital error regulator 7.

The components of digital error regulator 7 include first, an anti-coincidence circuit 9. The function of the anti-coincidence circuit 9 is to receive the input pulses from the reference generator 1 and from the pulse tachometer 8 and relay them on a non-synchronous basis to a reversible counter 10. Hence, the reference signal, $f_o$, is fed into the anti-coincidence circuit 9 on input terminal 12 while the output from the pulse tachometer 8 is fed into anti-coincidence circuit 9 by way of input terminal 13. Anti-coincidence circuit 9 will generate three output signals in order to control the counting of reversible counter 10. These signals are a first signal which calls for counting in the "up" direction, a second signal to command counting in the "down" direction and a third output which constiutes a trigger signal.

The combination of anti-coincidence circuit 9 and reversible counter 10 operates so that a pulse from the reference generator 1 will cause counter 10 to count in one direction, whereas a pulse from the pulse tachometer 8 will cause it to count in the other direction. In this fashion, the reversible counter 10 accumulates the digital error necessary to offset the inherent inaccuracies in the main analog control loop.

As was pointed out above, the anti-coincidence circuit 9 generates three signals. The first signal, on output terminal 14, calls for the reversible counter 10 to count in the "up" direction. The second signal, on output terminal 15, calls for reversible counter 10 to count in the "down" direction and a third signal, on output terminal 16, operates to initiate counting and is the so called trigger signal. The signal to count down is relayed into reversible counter 10 by input terminal 18, the count up signal on input terminal 17 and the trigger on input terminal 19.

Since the main control loop in the present embodiment is an analog loop, it is necessary to convert the contents of the digital error regulator 7 to an analog voltage before feeding this error signal into the summing point 3. This is accomplished by the digital-to-analog converter 11 which is connected to reversible counter 10 and operates to generate an analog voltage proportional to the contents of the reversible counter 10. Digital-to-analog converter 11 may be of any of the several types of such converters which are well known in the art. Finally, the output of digital-to-analog converter 11 is fed to form the third, and corrective, input to the summing point 3 in the main analog control loop.

Before turning to a detailed explanation of the logic diagrams of FIGS. 3 and 4, it will be necessary to briefly explain the operation of the logic elements which are used in these logic diagrams. Since the portions of the system shown in FIGS. 3 and 4 are parts of the digital error regulator, the signals within this part of the system are confined to two discrete logic levels. These logic levels are referred to as logic "1" which may comprise a positive voltage, say plus five volts. The other logic level is denoted logic "0" and is a lower voltage, say 0 volts. Hereinafter no specific voltage will be referred to but rather the logic levels described above will be used.

The portions of the system shown in FIGS. 3 and 4 operate on NAND type logic. Hence, the gates used in these logic diagrams have the following characteristic: when all inputs are at a logic "1" level, the output (denoted by a circle) is a logic "0"; under all other conditions, the output will be a logic "1." It should be noted that while only one type of gate is used in these logic diagrams, two different representations are used. This results from the fact that NAND type logic can be used to accomplish both AND and OR functions. Hence, a NAND gate which operates to function essentially as an AND gate is represented by the symbol shown for gate 26. On the other hand, a NAND gate which is used to accomplish essentially an OR function will be represented by the symbol shown for gate 30.

In addition to logic gates, the logic diagrams also utilize flip-flops. The flip-flops shown such as, for example, flip-flop 22 in FIG. 3, are flip-flops of the so-called master-slave type. As is well known, a flip-flop is a bi-stable device capable of assuming one of two stable conditions, referred to as "set" and "clear." Hence, the outputs of the flip-flop 22 are marked with the symbols 1 and 0. These labels indicate the logic signal present at that particular output terminal when the flip-flop 22 is in the set state. Hence, when the flip-flop 22 is set, the 1 output will be a logic "1." Conversely, when the flip-flop is in the "clear" state, the 1 output will be a logic "0." To change the state of the flip-flop 22, there are provided steering and trigger terminals. To assume the set state it is necessary to put a logic "1" on the set steering terminal S. This condition, along with a logic "1" on the trigger terminal T, causes the master portion of the master-slave flip-flop to set. When the signal at the trigger terminal T goes to a logic "0" state, the slave portion of the master-slave flip-flop is set and hence the output terminals 1 and 0 assume their states as indicated above for the set condition. Similarly, when it is desired to clear the flip-flop 22, it is necessary that the clear steering terminal C become a logic "1," along with a logic "1" on the trigger terminal T. When the trigger terminal T is a logic "1," the master portion of the master-slave flip-flop will assume the clear state. When the signal on the trigger input T goes to logic "0," the slave portion of the flip-flop 22 will assume the clear state and the output terminals 1 and 0 will assume the logic state indicative of the clear condition. Finally, in addition to the clocked inputs, it is also possible to directly set or clear the slave flip-flop. This is accomplished by means of the direct set input SD and the direct clear input CD. As indicated by the circle on these inputs, a logic "0" at the SD input causes the slave portion of the master-slave flip-flop to immediately assume the set state. Similarly, the presence of a logic "0" at input terminal CD causes the slave portion of the flip-flop 22 to immediately assume the clear state.

Turning now to FIG. 3, there is shown a detailed logic diagram of the anti-coincidence circuit 9 shown in FIG. 2. The function of anticoincidence circuit 9 is to receive the output of the reference generator 1 and the output of the pulse tachometer 8, store them and release them to be counted by reversible counter 10 in a non-synchronous fashion. That is, anti-coincidence circuit 9 acts to prevent the simultaneous presentation of pulses from both the reference generator 1 and the pulse tachometer 8 to the reversible counter 10. Briefly, this is accomplished by storing the pulses from the pulse tachometer 8 in flip-flop 20 and storing the pulses from the reference generator 1 in the flip-flop 21. At appropriate times, governed by the output of a two bit counter consisting of flip-flops 22 and 23, the stored pulses are released by transferring them from flip-flops 20 and 21 to flip-flops 24 and 25, respectively.

The storing and release of pulses is synchronized by means of an input frequency, $fm$, which forms the trigger input to flip-flop 22. This frequency will be a relatively high frequency, something in the order of four times greater than the maximum possible frequency which may be generated by the reference generator 1. As can be seen, the interconnection of flip-flops 22 and 23 is such that these flip-flops form a two bit counter, thereby essentially dividing the frequency, $fm$, into four discrete signals. The four discrete time segments into which the frequency, $fm$, is divided are decoded by means of gates 26, 27, 28 and 29. The outputs of the gates 26, 27, 28 and 29 are represented by referring to them as the first, second, third and fourth time units, respectively. Using this terminology, operation can be summarized as follows.

As can be seen, an input pulse from the reference generator 1 is relayed to input terminal 12 (FIG. 2) directly to the trigger terminal T (FIG. 3) of flip-flop 21. Since the set steering input is permanently tied to the logic "1" level, pulses received from the input terminal 12 will be stored in flip-flop 21. They will remain stored in flip-flop 21 until such time as flip-flop 25 assumes the "set" state. At this time, connection of the 0 output of flip-flop 25 to the CD terminal of flip-flop 21 causes flip-flop 21 to assume the clear state when flip-flop 25 assumes the set state. During the first time unit, the output of gate 26 is a logic "0." Since the output of gate 26 is connected to the trigger terminal T of flip-flop 25, flip-flop 25 cannot set during the first time unit. Similarly, during the second time unit, the output of gate 27 is a logic "0." This places a logic 0 on the direct clear terminal DC of flip-flop 25 and hence flip-flop 25 cannot set during the second time unit.

However, during the third and fourth time units it is possible for flip-flop 25 to set if flip-flop 21 had previously set upon the occurrence of an input pulse from reference generator, $fo$. It will be noted that the third and fourth time units correspond to the setting of flip-flop 23 in the two bit counter. Hence, if a pulse had previously been stored in flip-flop 21, it will be transferred to flip-flop 25 during the third time unit. Since the 0 output terminal of flip-flop 25 forms one input to gate 30, the output of gate 30 will become a logic "1" if flip-flop 25 assumes the set state. During the fourth time unit, flip-flops 22 and 23 are both set. The signal F1 (which comes from the 1 output terminal of flip-flop 22) will go to logic "1" and this will cause the output of gate 31 to go to logic "0" thereby transmitting a trigger pulse via output terminal 16 to the reversible counter 10. Since this trigger pulse was transmitted during the fourth time unit, it will result in counting reversible counter 10 in the "up" direction since signal F2 on output terminal 14 is also a logic "1" at this time.

Operation is the same for feedback pulses from the pulse tachometer 8 which are stored in flip-flop 20 and transferred during the first time unit to flip-flop 24. During the second time unit, a trigger is generated on output terminal 16 which causes the reversible counter 10 to count down by virtue of the signal $\overline{F2}$ on the down steering output terminal 15.

Turning now to FIG. 4, there is shown in abbreviated form a logic diagram of the reversible counter 10 shown in FIG. 2. As is well known, a reversible counter of the type utilized in the present embodiment is simply a digital counter which operates so as to count in two directions in response to input signals which call for counting in either the up or down direction. The counter, which may be of any length as required by the particular application, consists of a series of flip-flops 40, 41, 42, 43 and 44. Flip-flops 40–44 are inter-connected so as to comprise a reversible binary counter of the desired length. The entire counter is not shown in FIG. 4, nor are all of the flip-flops required, since the configuration of such reversible counters is well known in the art.

As was pointed out in the description of the anti-coincidence circuit 9, the output of anti-coincidence circuit 9 will comprise trigger and steering signals appropriately timed to command the reversible counter 10 to count in either the positive or negative direction. When it is desired to count the reversible counter in the up direction, a logic "1" will be present on output terminal 14 of anti-coincidence circuit 9. This will be relayed to the reversible counter 10 by way of input terminal 17. At the same time, a logic "0" will be present at output terminal 16 of anti-coincidence circuit 9 which is connected to input terminal 19 of the reversible counter 10. Inverter 45 has its input connected to input terminal 19 and the output of inverter 45 will become a logic "1" whenever a trigger signal is present on input terminal 19. The output of inverter 45 is then connected to the trigger terminals T of the flip-flops 40–44.

Input terminal 17 forms one of the inputs to gate 46, the output of gate 46 being used to steer the reversible counter in the up direction. When a logic "1" is present at input terminal 17, the output of gate 46 will be a logic "0" if its other input, which is formed by the output of gate 47, is also a logic "1." The function of gate 47 is to prevent the reversible counter 10 from exceeding a predetermined count in the positive direction. Since the reversible counter 10 forms a part of the digital error regulator 7, under transient conditions the error may be greater than the capabilities of the reversible counter 10. This is true because the digital error regulator 7 has, as was pointed out above, a limited range of approximately 5 percent of the total speed range. Hence, the function of gate 47 is to prevent the reversible counter 10 from counting all the way to its maximum count and, at the next input pulse, rolling over to zero. This is prevented by virtue of the fact that the "1" output terminals of the flip-flops 40–44 form the inputs to gate 47. If all the flip-flops in the counter 10 are in the set state, all inputs to gate 47 will be logic "1" and hence the output of gate 47 will be a logic "0." Since the output of gate 47 is a logic "0," gate 46 cannot relay input pulses from input terminal 17 and the counter is prevented from rolling over to zero. While the present embodiment prevents further counts only when all flip-flops in the counter are in the set state, it is obvious that the counter could be inhibited at any desired count simply by appropriate connection of the inputs of gate 47.

In a similar fashion, gates 48 and 49 operate to prevent counting the reversible counter through zero in the negative direction. That is, if all the flip-flops 40–44 in the reversible counter are in the clear state, all inputs to gate 49 will be logic "1" and hence gate 48 is prevented from relaying further steering pulses which would otherwise cause the reversible counter 10 to count backwards through zero.

Although the present invention has been described with respect to a particular embodiment, the principles underlining this invention will suggest many additional modifications of the particular embodiment shown to those skilled in the art. Therefore, it is intended that the appended claims shall not be limited to the specific embodiment described but rather shall cover all such modifications as fall within the true spirit and scope of the invention.

What I claim as new and desire to secure by Letters Patent of the United States is:

1. A system for controlling an output of a dynamoelectric machine by varying the excitation of the machine, comprising, in combination:
    (a) means for generating time-varying reference signals having a frequency which is indicative of a desired output of the machine;
    (b) a first control loop operative on analog signals, responsive to the reference signals and to signals indicative of the actual output of the machine for controlling the excitation of the machine throughout the entire range of the possible variations of the output; and
    (c) a second control loop operative on digital signals, interconnected with an output portion of said first control loop and operative over a preselected band of variations of the output of the dynamoelectric machine in response to the reference signals and in response to signals indicative of the actual output of the machine to correct for inaccuracies which occur within the preselected band of variations.

2. A system according to claim 1 wherein the dynamoelectric machine comprises an electric motor and the controlled output of the motor comprises motor speed.

3. A control system for controlling the speed of an electric motor comprising:
    (a) a reference generator for generating a time-varying signal, the frequency of which is indicative of the motor speed desired;
    (b) motor speed indication means connected to the motor being controlled;
    (c) a first control loop utilizing as its reference signal the output of a frequency-to-analog converter having an input connected to the output of said reference generator and further utilizing as its feedback signal the output of said motor speed indication means; and
    (d) a second control loop comprising a digital error regulator operative over a preselected limited range of speed variations, with the first input of said second control loop comprising the output of said reference generator and the second input comprising the output of said motor speed indication means, the output of said second control loop being combined with the output of said first control loop so as to generate an error signal for operating the motor being controlled.

4. The control system as recited in claim 3 wherein said digital error regulator comprises a reversible counter operatively connected to said reference generator and said motor speed indication means so that said reversible counter counts in one direction in response to pulses from said reference generator and counts in the opposite direction in response to pulses from said motor speed indication means.

5. The control system as recited in claim 4 further comprising an anti-coincidence circuit operatively connected to receive the pulses output by said reference generator and said motor speed indication means, said anti-coincidence circuit being operative to non-simultaneously relay pulses from said reference generator and said motor speed indication means to said reversible counter.

6. The control system as recited in claim 4 further comprising a digital-to-analog converter connected to the output of said reversible counter, thereby converting the output of said digital regulator to an analog signal.

7. The control system as recited in claim 6 wherein said motor speed indication means comprises an analog voltage tachometer as the feedback element in said first control loop and a digital pulse tachometer as said second input to said digital error regulator.

8. A control system for controlling the speed of a motor comprising:
    (a) a reference generator for generating a time-varying signal the frequency of which is indicative of the motor speed desired;
    (b) a main analog control loop comprising:
        (1) a frequency-to-analog converter connected to the output of said reference generator;
        (2) motor speed indication means for providing an analog signal indicative of the motor speed; and
        (3) a summing point for comparing the output of said frequency-to-analog converter and said motor speed indication means, the output of said summing point being connected to control the transfer of power to the motor;

(c) a vernier digital control loop comprising:
  (1) a reversible counter whose first count control input is operatively connected to said reference generator and whose second count control input is operatively connected to said motor speed indication means and means for preventing said reversible counter from exceeding a predetermined count so as to limit the band of speed variations to which said digital loop responds;
  (2) a digital-to-analog converter operatively connected to said reversible counter so as to convert the digital contents of said counter to an analog voltage, the output of said digital-to-analog converter being additively connected to said summing point in said main analog control loop.

References Cited

UNITED STATES PATENTS 3,324,364  6/1967  Caruthers ____ 318—(20.260X)

ORIS L. RADER, Primary Examiner

H. HUBERFELD, Assistant Examiner

U.S. Cl. X.R.

318—18, 341